(12) United States Patent
Robinson

(10) Patent No.: US 10,946,735 B2
(45) Date of Patent: Mar. 16, 2021

(54) BELT ASSEMBLY FOR VEHICLE HAVING HOOK AND SWING ATTACHMENT AND ASSOCIATED METHOD

(71) Applicant: COOPER-STANDARD AUTOMOTIVE INC., Novi, MI (US)

(72) Inventor: Aaron Robinson, Ortonville, MI (US)

(73) Assignee: COOPER-STANDARD AUTOMOTIVE, INC., Novi, MI (US)

( * ) Notice: Subject to any disclaimer, the term of this patent is extended or adjusted under 35 U.S.C. 154(b) by 314 days.

(21) Appl. No.: 16/083,288

(22) PCT Filed: Mar. 7, 2017

(86) PCT No.: PCT/US2017/021100
§ 371 (c)(1),
(2) Date: Sep. 7, 2018

(87) PCT Pub. No.: WO2017/155955
PCT Pub. Date: Sep. 14, 2017

(65) Prior Publication Data
US 2020/0298691 A1  Sep. 24, 2020

Related U.S. Application Data
(60) Provisional application No. 62/304,763, filed on Mar. 7, 2016.

(51) Int. Cl.
*B60J 10/75* (2016.01)
*B60J 10/30* (2016.01)
*B60J 10/00* (2016.01)

(52) U.S. Cl.
CPC ............. *B60J 10/75* (2016.02); *B60J 10/30* (2016.02); *B60J 10/45* (2016.02)

(58) Field of Classification Search
CPC ........................................................ B60J 10/75
See application file for complete search history.

(56) References Cited

U.S. PATENT DOCUMENTS

| | | | |
|---|---|---|---|
| 4,291,076 A * | 9/1981 | Katoh | B60R 13/07 |
| | | | 293/126 |
| 5,085,005 A | 2/1992 | Yasukawa et al. | |
| (Continued) | | | |

FOREIGN PATENT DOCUMENTS

| | | | | |
|---|---|---|---|---|
| EP | 1 382 474 A1 | 1/2004 | | |
| EP | 1382474 A1 * | 1/2004 | ............. | B60J 10/30 |
| (Continued) | | | | |

OTHER PUBLICATIONS

PCT/US2017/021100 International Search Report and Written Opinion, dated May 31, 2017.

*Primary Examiner* — Catherine A Kelly
(74) *Attorney, Agent, or Firm* — Fay Sharpe LLP

(57) ABSTRACT

A belt assembly for an associated vehicle has a body that includes a substantially planar region dimensioned for abutting engagement with the vehicle. At least one seal lip extends outwardly from a first face of the body to engage an associated surface of a vehicle window. A first hook is provided on the body for receipt over a terminal tip of the vehicle structural assembly, and a second hook is dimensioned for at least partial receipt through an associated opening around the door window opening. The first hook is positioned over the terminal tip and then the second hook is rotated until the second hook elastically deforms outwardly and subsequently snap fits into an associated opening and the substantially planar region abuts along the associated structural assembly of the door to preclude movement of the belt assembly upwardly, cross-car, and fore-and-aft relative to the associated vehicle.

8 Claims, 7 Drawing Sheets

(56) References Cited

U.S. PATENT DOCUMENTS

| | | | |
|---|---|---|---|
| 5,261,188 A | 11/1993 | Vaughan | |
| 5,463,831 A | 11/1995 | Shinagawa et al. | |
| 5,561,003 A * | 10/1996 | Nowosiadly | B60R 13/0206 296/93 |
| 5,775,030 A | 7/1998 | Hamabata | |
| 5,799,442 A | 9/1998 | Takahashi et al. | |
| 6,070,363 A * | 6/2000 | Vance | B29C 65/56 277/921 |
| 6,141,854 A | 11/2000 | Mueller et al. | |
| 6,260,254 B1 | 7/2001 | Mueller et al. | |
| 6,446,392 B1 * | 9/2002 | Maki | B60J 10/265 49/377 |
| 6,598,348 B2 | 7/2003 | Palicki | |
| 6,681,526 B2 | 1/2004 | Mueller et al. | |
| 6,742,304 B1 | 6/2004 | Mueller et al. | |
| 7,147,209 B2 * | 12/2006 | Jones | B25B 27/0092 254/25 |
| 7,565,771 B2 * | 7/2009 | Brocke | B60J 10/16 49/377 |
| 8,104,227 B2 | 1/2012 | Tamura | |
| 8,549,790 B2 * | 10/2013 | Murree | B60J 10/30 49/377 |
| 8,689,489 B2 | 4/2014 | Mine | |
| 8,798,313 B2 | 8/2014 | Simske et al. | |
| 9,003,709 B2 | 4/2015 | Patterson et al. | |
| 9,061,574 B2 * | 6/2015 | Ertl | B60J 10/265 |
| 9,169,688 B2 | 10/2015 | Wende | |
| 2001/0025454 A1 * | 10/2001 | Cretin | B60J 10/265 49/441 |
| 2004/0200151 A1 * | 10/2004 | Tognetti | B60J 10/75 49/377 |
| 2013/0133267 A1 | 5/2013 | Kanazawa | |
| 2013/0270855 A1 | 10/2013 | Fukui | |
| 2015/0266366 A1 | 9/2015 | Kuno | |

FOREIGN PATENT DOCUMENTS

| | | |
|---|---|---|
| WO | WO 2005/042286 A1 | 5/2005 |
| WO | WO 2009/143250 A1 | 11/2009 |

* cited by examiner

BELT ASSEMBLY FOR VEHICLE HAVING HOOK AND SWING ATTACHMENT AND ASSOCIATED METHOD This application claims the priority benefit of U.S. Provisional Application No. 62/304,763, filed Mar. 7, 2017, the disclosure of which is incorporated herein by reference.

BACKGROUND

The present disclosure relates to a seal assembly that is also referred to in the industry as a weatherstrip, weatherseal, or seal assembly, and more particularly a weatherseal assembly used in connection with a vehicle. The weatherseal assembly of the present disclosure specifically relates to what is known as a vehicle belt assembly that is provided along a lower edge of a window opening formed in a door of the vehicle.

Belt seal assemblies are generally known in the art. For example, commonly owned patents and published applications U.S. Pat. Nos. 4,949,507; 5,207,027; 5,493,815; 5,618,593; US 2005/0235569A1; and WO 2009/143250 A1 are representative of other belt seal assemblies.

A need exists for a weatherseal assembly that is cost effective, easy to manufacture, conducive to assembly on the vehicle door, and provides stability along three axes of an orthogonal coordinate system that assures desired sealing characteristics of the assembly relative to the window and vehicle door.

SUMMARY

A belt assembly for an associated vehicle has at least one opening in a structural assembly adjacent a belt line of a window opening that receives a movable window. A body has a longitudinal length dimensioned to extend along the associated belt line, the body including a substantially planar region dimensioned for abutting engagement with the associated structural assembly. At least one seal lip extends outwardly from a first face of the body to engage an associated surface of the associated vehicle window. A first hook is provided on the body extending outwardly from a second face opposite the first face of the substantially planar region adjacent a first portion thereof, the first hook dimensioned for receipt over a terminal tip of the associated structural assembly. A second hook is provided on the body at a location spaced from the first hook and extending outwardly from the second face of the substantially planar region adjacent a second portion thereof, the second hook dimensioned for at least partial receipt through the associated opening in the structural assembly, whereby the first hook is positioned over the terminal tip of the associated structural assembly with the substantially planar region angling outwardly from the associated structural assembly, and rotating the second hook toward the associated opening urges the substantially planar region toward the associated structural assembly until the second hook elastically deforms outwardly and subsequently snap fits into the associated opening and the substantially planar region abuts along the associated structural assembly to preclude movement of the belt assembly upwardly, cross-car, and fore-and-aft relative to the associated vehicle.

A method of assembling a belt assembly to an associated vehicle is also disclosed, where the vehicle has at least one opening in a structural assembly adjacent a belt line of a window opening that receives a movable window, the belt assembly includes a body having a longitudinal length dimensioned to extend along the associated belt line, the body includes a substantially planar region dimensioned for abutting engagement with the associated structural assembly, at least one seal lip extends outwardly from a first face of the body to engage an associated surface of the associated vehicle window, a first hook is provided on the body extending outwardly from a second face opposite the first face of the substantially planar region adjacent a first portion thereof, the first hook is dimensioned for receipt over a terminal tip of the associated structural assembly, a second hook is provided on the body at a location spaced from the first hook and extends outwardly from the second face of the substantially planar region adjacent a second portion thereof, and the second hook is dimensioned for at least partial receipt through the associated opening in the structural assembly.

The method includes positioning the first hook over the terminal tip of the associated structural assembly with the substantially planar region angling outwardly from the associated structural assembly, rotating the second hook toward the associated opening, and urging the substantially planar region toward the associated structural assembly until the second hook elastically deforms outwardly and subsequently snap fits into the associated opening and the substantially planar region abuts along the associated structural assembly to preclude movement of the belt assembly upwardly, cross-car, and fore-and-aft relative to the associated vehicle.

A primary advantage of the disclosure resides in an effective belt line weatherseal assembly, and a method of mounting the beltline weatherseal assembly to an associated vehicle which provides for proper alignment relative to the vehicle and window, and inhibits movement relative to the vehicle, along three axes in an orthogonal coordinate system.

Benefits and advantages of the present disclosure will become more apparent from reading and understanding the following detailed description.

DETAILED DESCRIPTION

Figure 1:
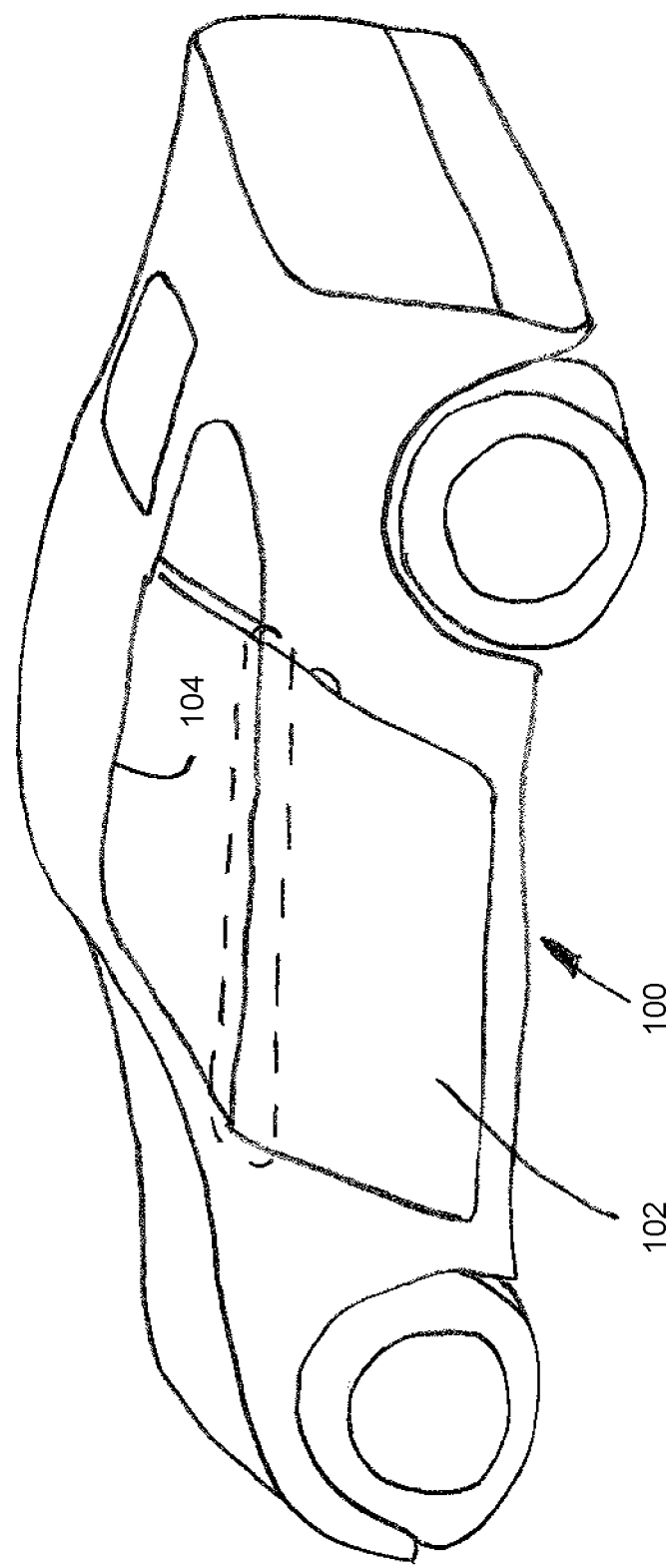
FIG. 1 is a perspective view of a representative vehicle in which the weatherseal assembly can be installed.

Turning to FIG. 1, there is shown a vehicle 100 having a door 102 with a window opening 104. As is well known, a window 106 (FIG. 2) moves upwardly and downwardly in the door 102 to selectively close the window opening in an upper, raised position, and provide an opening in the door in a lowered position. The door 102 includes a first or outer panel 108 and a flange 110. A tip 112 of the flange 110 is spaced from the outer panel 108 along the upper edge thereof. The tip 112 has a substantially planar portion 114, and slots or openings 116 are provided in the flange 110 and preferably spaced along a longitudinal extent of the flange at a transition region between the tip and the remainder of the flange. The planar portion 114 of the flange 110 is generally parallel to a second or inner door panel assembly 118, and likewise is generally parallel to the window 106.

A weatherstrip or weatherseal assembly 130, sometimes referred to as a belt assembly, is received on the flange 110, specifically the assembly is received on the tip 112 of the metal flange 110. The weatherseal assembly 130 is preferably contoured for a snap-fit reception on the flange 110 as will be described in greater detail below. Particularly, the weatherseal assembly 130 includes a body 132 that has a planar portion 134 dimensioned for abutting engagement with planar portion 114 of the tip 112. In the preferred arrangement, the body 132 is strengthened or reinforced with a rigid carrier 136. As shown, the carrier 136 has a height that extends along the full height of the planar portion 136 of the body (i.e., extends along the full height of the planar portion 114 of the tip when mounted to the vehicle), and also extends above a terminal end of the tip to provide structural support to the weatherseal assembly 130 in that region disposed above the flange tip 112. At a first or lower end of the body 132 is provided a first sealing lip 150 that extends outwardly from the body toward the window 106. The first sealing lip 150 may include a flock, or low friction material or coating 152 that reduces friction between the first sealing lip and the surface of the window 106 during relative movement between the two when the window is raised and lowered. In a similar manner, at a second or upper end of the body 132 there is a provided a second sealing lip 154 that extends outwardly from the body toward the window 106. The second sealing lip 154 likewise preferably includes a flock, or low friction material or coating 156 to reduce friction between the window 106 and second sealing lip. The first and second sealing lips 150, 154 are contoured to exert a desired force against the window surface that serves as a dynamic seal relative to the external environment, and without exerting undue drag on the window as it is raised and lowered. Thus, although the sealing lips 150, 154 are shown to "overlap" with the window, this position of the sealing lips represents their position in the absence of the window, and when the window is raised, the sealing lips resiliently bend toward the body 132 and slide along the surface of the window.

In addition, a first or lower retention member or hook 170 extends outwardly from the body 132, and particularly in a direction generally opposite that of the first seal lip 150. The first retention hook 170 includes a shoulder 172 that extends upwardly from a remainder of the first hook and is dimensioned for receipt in one of the openings 116 in the vehicle flange 110. Further, a second or upper retention member or hook 180 extends outwardly from the body 132. Again, the second retention hook 180 extends from the body 132 in a direction generally opposite that of the second seal lip 154. The second retention hook 180 includes a hook arm 184 that has a generally L-shape forming a cavity 186 that is dimensioned to receive the terminal edge of the flange tip 112 for reasons which will become more apparent below.

In addition, an arm or what is sometimes referred to in the industry as a hammerhead 190 is provided at the upper end of the body 132. The arm 190 includes a show surface 192. The arm 190 has a dimension or length extending from the body 132 and is preferably unreinforced (i.e. no carrier in the arm) to provide sufficient flexibility to extend over the upper edge of the outer panel 108. This allows the belt seal to account for tolerance requirements in the assembly.

Figure 2:
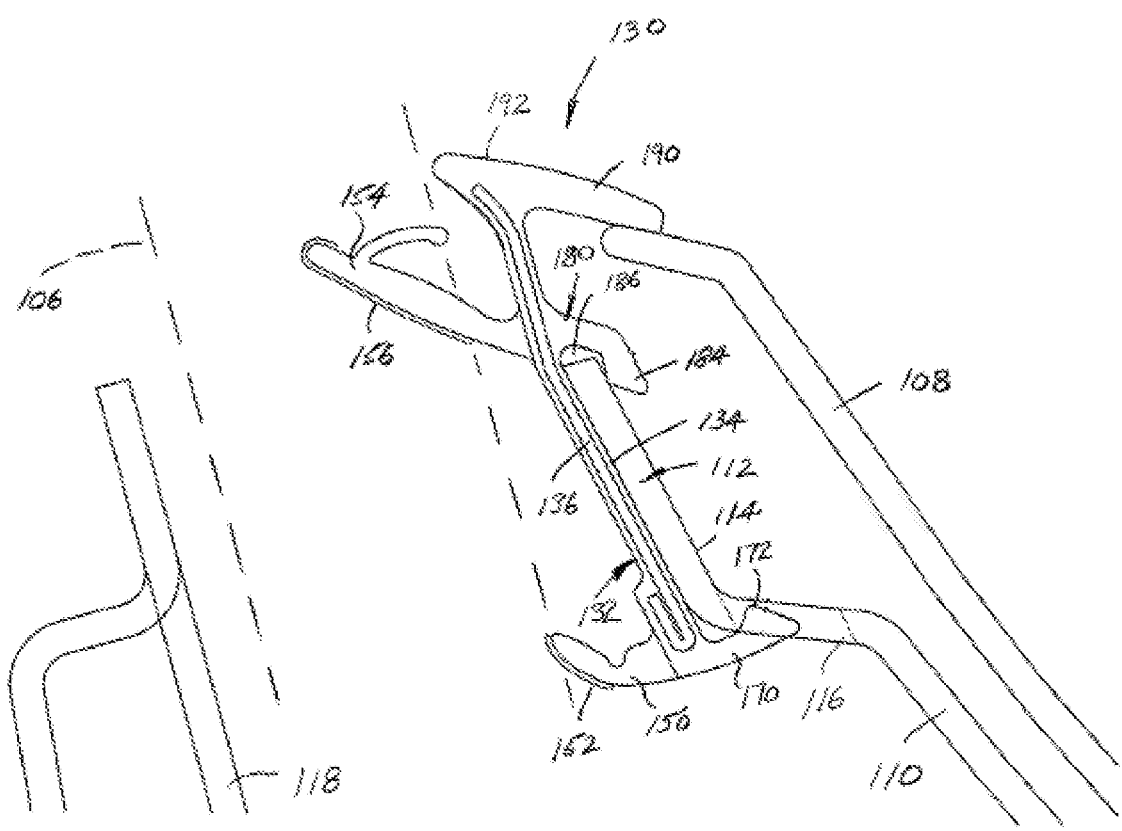
FIG. 2 is a cross-sectional view of the weatherseal assembly mounted to the vehicle along the belt line of the window opening in the door.
Figure 3:
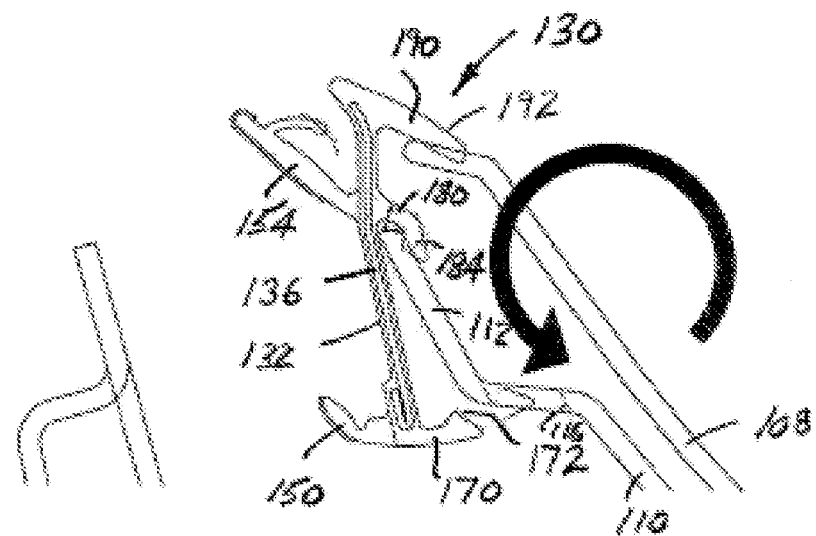
FIGS. 3-6 are cross-sectional views similar to FIG. 2 and illustrating progressive installment steps of the weatherseal assembly.
Figure 4:
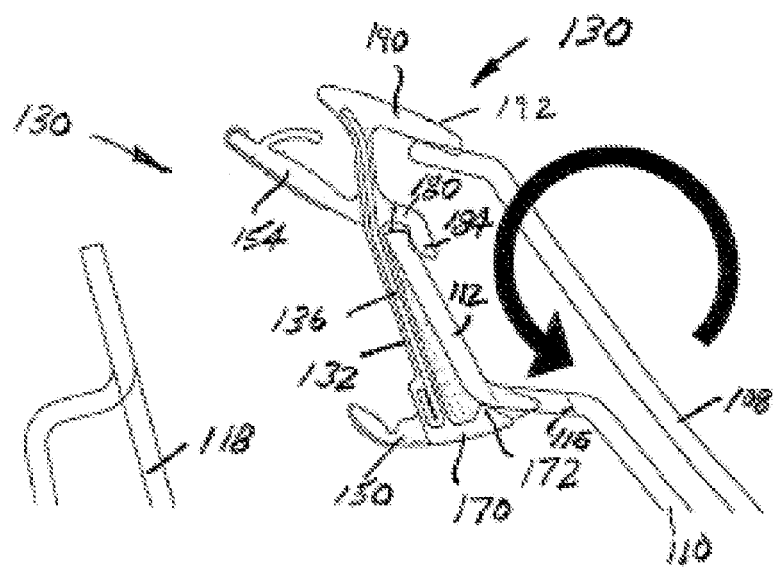
Figure 5:
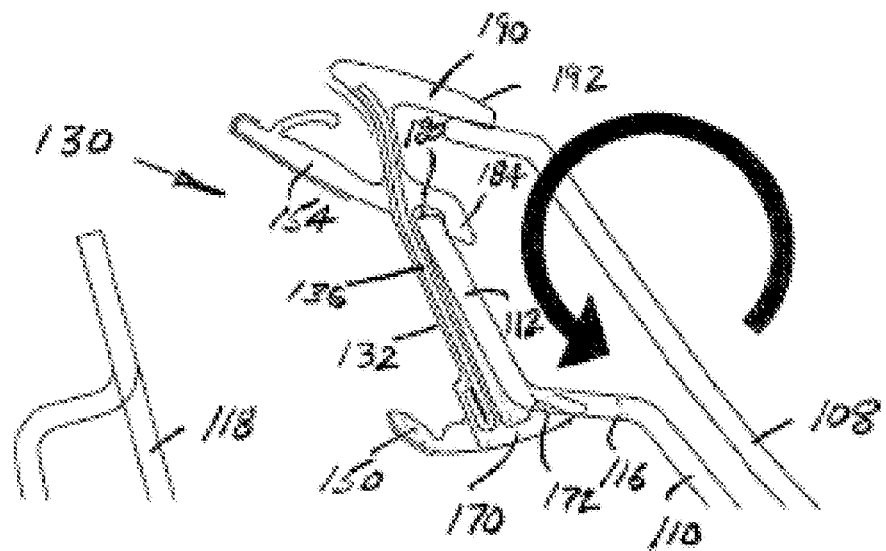

With continued reference to FIG. 2, and additional reference to FIGS. 3-6, a preferred method of installation of the weatherseal assembly 130 is illustrated. FIG. 3 shows placement of the hook arm 184 of the second retention hook 180 over the terminal edge of the flange tip 112. It is also noted that the hammerhead is oriented for receipt on outer panel 108. The assembly 130 is then rotated (in a counterclockwise direction as illustrated) through a total angle of approximately 15 degrees. Of course the extent of rotation may vary from that described here. The total rotation is shown in separate steps in FIGS. 4, 5, and 6. The initial portion of the rotation advances the weatherseal assembly 130 about a pivot defined between the second hook arm 184 and the terminal end of the flanged tip (FIG. 4). This initial portion of rotation is approximately 8° and brings the shoulder 172 of the first retention hook 170 into abutting engagement with the transition region between the tip 112 and the flange 110. Still further rotation (shown as an exemplary 4° in FIG. 5) advances the shoulder 172 of the first retention hook into the opening. The first hook arm 170 is stiff but has some limited flexibility to allow the shoulder 172 (with the tapered leading-edge to facilitate advancement over the tip) into the opening 116. The final degree of rotation illustrated in FIG. 6 brings the planar portion 136 of the weatherseal assembly 130 into abutting engagement with the planar portion 114 of the tip.

Figure 6:
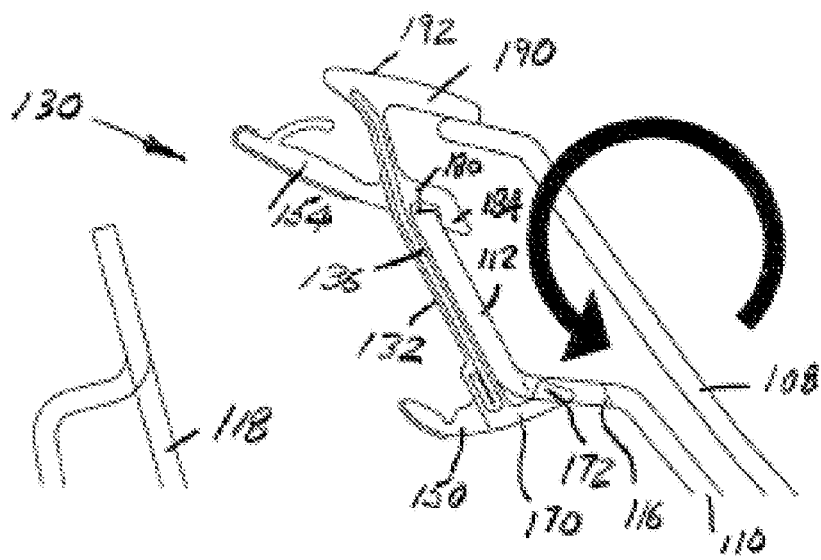
Figure 7:
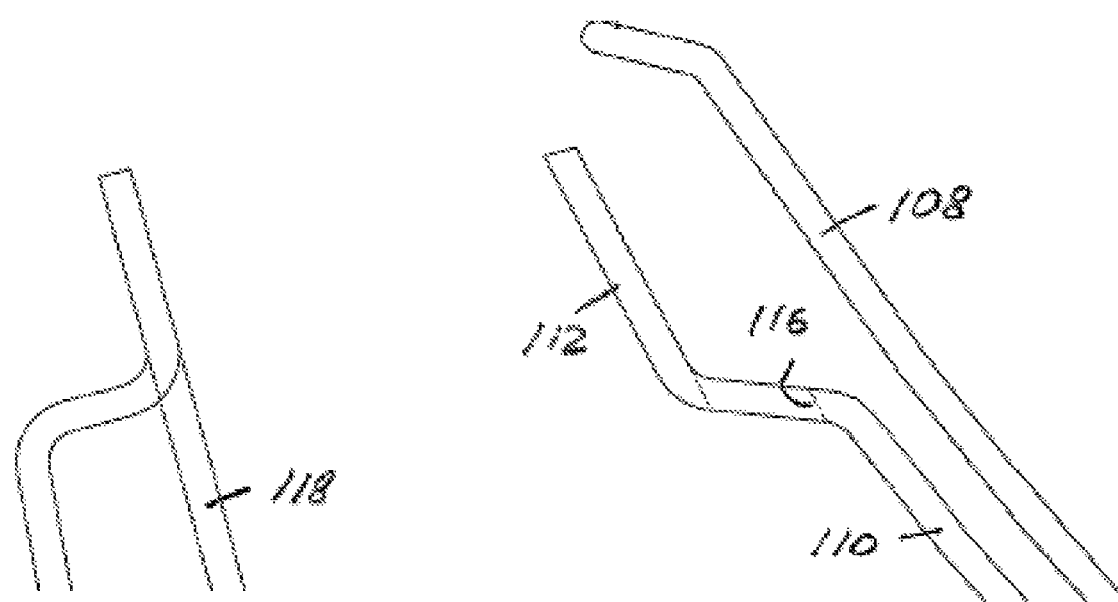
FIG. 7 is a cross-sectional view of the vehicle with the weatherseal assembly removed.
Figure 8:
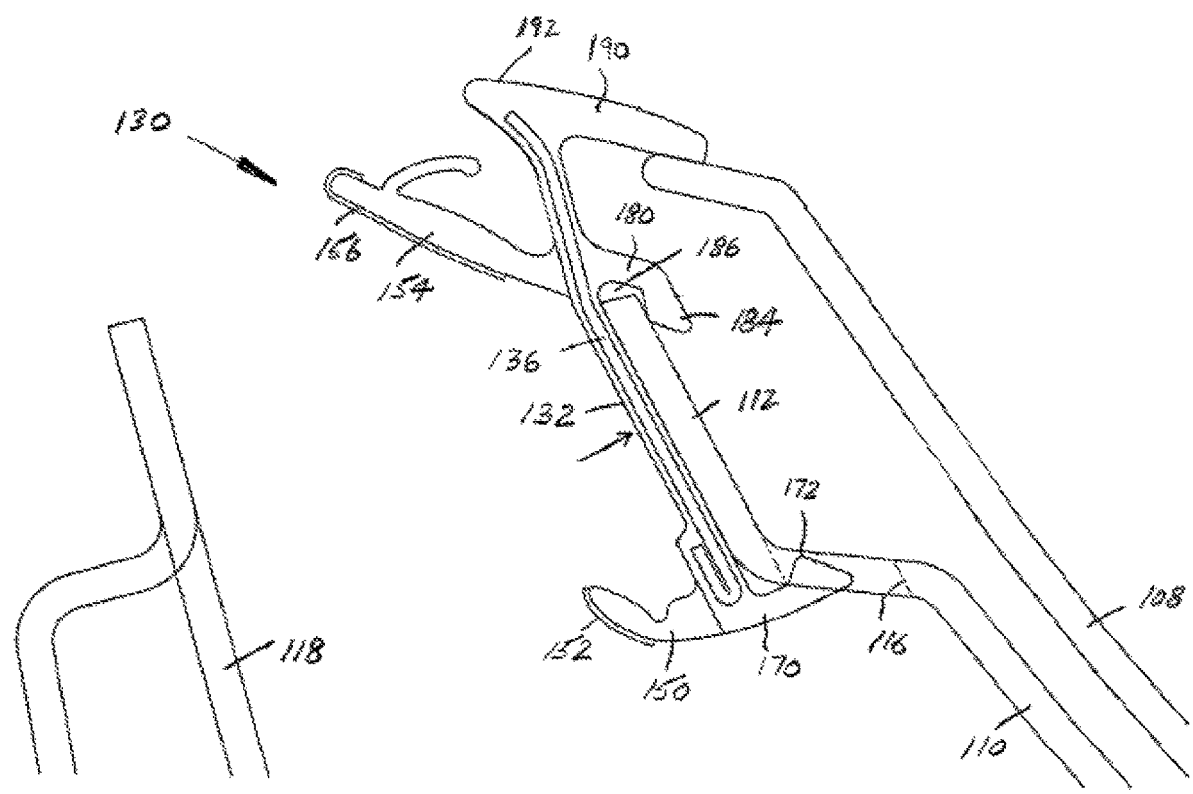
FIGS. 8 and 9 are view similar to FIG. 2 with additional notations of specific features and advantages thereof.
Figure 9:
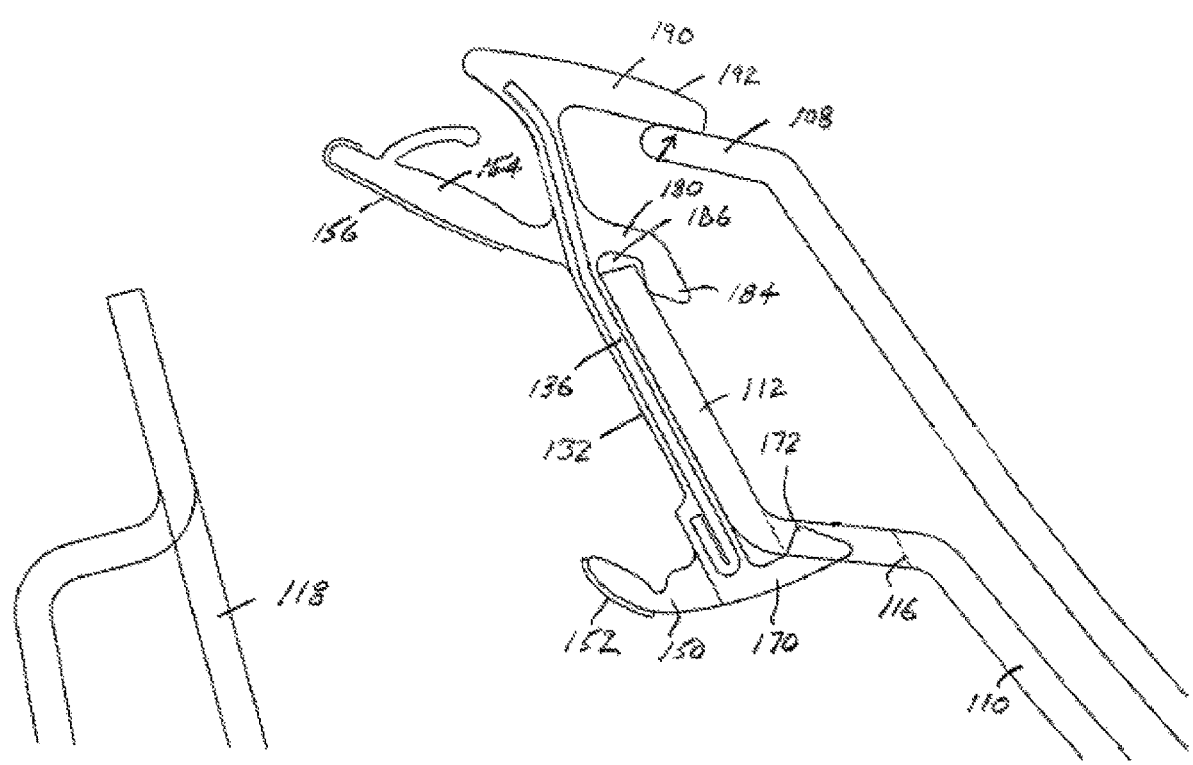

Once positioned as illustrated in FIG. 6 fasteners may be provided in adjacent pillars at opposite ends of the beltline (e.g. a and B pillar) to maintain the planar portions in abutting engagement. Thus as outlined in FIGS. 8 and 9, relative movement between the weatherseal assembly and the vehicle door is limited. The preferred material (TPV) coextruded on to the carrier of the weatherseal assembly provides desired stiffness, without requiring a carrier structure in either of the retention hook arms, or in the hammerhead. Simultaneously, there is some flexibility to allow the material to resiliently deform such that it step fits into place and the restoring force provides a tight gripping engagement among the hook arms, outer panel, and flanged 2 position the seal lips and the desired orientation. Moreover, the assembly is locked against movement in the fore and aft directions, cross-car, and upwardly and downwardly (FIG. 9).

The cross-section taken along an elongated length of a the belt assembly exhibits a structural profile that can be extruded/coextruded for ease of manufacture, although this preference should not be construed or deemed to limit the present disclosure to only extruded/coextruded weatherseal assemblies since all or portions thereof could also be manufactured in alternative, well-known ways, e.g., molding. Thus, the weatherseal assembly is preferably extruded from an elastomeric material that includes, for example, commonly used weatherstrip materials such as EPDM (ethylene propylene diene monomer rubber), TPE (thermoplastic elastomer), and/or TPV (thermoplastic vulcanizate) material, although this list of preferred materials should likewise not be deemed limiting since it is understood that other materials or combinations of materials can also be used. As noted above, at least a portion of the weatherseal assembly is oftentimes reinforced, for example, with a steel, aluminum and/or a wire carrier that is completely or partially encapsulated through the co-extruded manufacturing process. Again, this structural and manufacturing preference should not be construed as the only way to assemble or manufacture the weatherseal assembly. Further, the concepts of the present disclosure are shown relative to an outer belt seal assembly, but may also find application in connection with the inner belt seal assembly without departing from the scope and intent of the present disclosure.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A belt assembly for an associated vehicle having at least one opening in a structural assembly adjacent a belt line of a window opening that receives a movable window, the associated vehicle including an outer panel laterally spaced from a flange, the outer panel including a terminal end, and the flange having a substantially planar portion with a tip at one end spaced from the terminal end of the outer panel and the flange further including an opening therein spaced from the tip at a transition region, wherein the outer panel and flange are located at the belt line of the window opening, the belt assembly comprising:
   a body having a longitudinal length dimensioned to extend along the associated belt line, the body including a substantially planar region dimensioned for abutting engagement with the substantially planar portion of the flange of the associated structural assembly when assembled thereto;
   at least one seal lip extending outwardly from a first face of the body to engage an associated surface of the associated vehicle window;
   a first hook provided on the body extending outwardly from a second face opposite the first face of the substantially planar region adjacent a first portion thereof, the first hook dimensioned for receipt over the tip of the flange of the associated structural assembly; and
   a second hook provided on the body at a location spaced from the first hook and extending outwardly from the second face of the substantially planar region adjacent a second portion thereof, the second hook dimensioned for at least partial receipt through the opening in the flange of the associated structural assembly, whereby the first hook has a generally L-shape forming a cavity dimensioned to receive and positioned over the tip of the associated structural assembly with the substantially planar region angling outwardly from the associated structural assembly, and rotating the second hook toward the associated opening urges the substantially planar region toward the associated structural assembly until the second hook elastically deforms outwardly and subsequently snap fits into the associated opening and the substantially planar region abuts along the associated structural assembly to preclude movement of the belt assembly upwardly, cross-car, and fore-and-aft relative to the associated vehicle.

2. The belt assembly of claim 1 further comprising an arm provided at a terminal end of the body and dimensioned for receipt over the terminal end of the outer panel of the associated structural assembly.

3. The belt assembly of claim 2 wherein the arm extends outwardly from a second face opposite the first face of the body.

4. The belt assembly of claim 2 wherein the body includes a reinforcing member in the body and the reinforcing member does not extend into the first hook, second hook and arm that extend outwardly from the body.

5. The belt assembly of claim 1 wherein the body includes a reinforcing member in the body and the reinforcing member does not extend into the first hook and second hook that extend outwardly from the body.

6. The belt assembly of claim 1 wherein the second hook includes a protruding shoulder dimensioned for receipt in the associated opening of the associated structural assembly.

7. A belt assembly for an associated vehicle having at least one opening in a structural assembly adjacent a belt line of a window opening that receives a movable window, the associated vehicle including an outer panel laterally spaced from a flange, the outer panel including a terminal end, and the flange having a substantially planar portion with a tip at one end spaced from the terminal end of the outer panel and the flange further including an opening therein spaced from the tip at a transition region, wherein the outer panel and flange are located at the belt line of the window opening, the belt assembly comprising:
   a body having a longitudinal length dimensioned to extend along the associated belt line, the body including a substantially planar region dimensioned for abutting engagement with the substantially planar portion of the flange of the associated structural assembly when assembled thereto;
   at least one seal lip extending outwardly from a first face of the body to engage an associated surface of the associated vehicle window;
   a first hook provided on the body extending outwardly from a second face opposite the first face of the substantially planar region adjacent a first portion thereof, the first hook dimensioned for receipt over the terminal tip of the flange of the associated structural assembly;
   a second hook provided on the body at a location spaced from the first hook and extending outwardly from the second face of the substantially planar region adjacent a second portion thereof, the second hook dimensioned for at least partial receipt through the associated opening in the flange of the associated structural assembly;
   an arm provided at a terminal end of the body that extends outwardly from the second face of the body and dimensioned for receipt over the terminal end of the outer panel of the associated structural assembly; and
   a reinforcing member in the body and the reinforcing member does not extend into the first hook, second hook, and arm that extend outwardly from the body, whereby the first hook has a generally L-shape forming a cavity dimensioned to receive and positioned over the tip of the associated structural assembly with the substantially planar region angling outwardly from the associated structural assembly, and rotating the second hook toward the associated opening urges the substantially planar region toward the associated structural assembly until the second hook elastically deforms outwardly and subsequently snap fits into the associated opening and the substantially planar region abuts along the associated structural assembly to preclude movement of the belt assembly upwardly, cross-car, and fore-and-aft relative to the associated vehicle.

8. The belt assembly of claim 7 wherein the second hook includes a protruding shoulder dimensioned for receipt in the associated opening of the associated structural assembly.

\* \* \* \* \*